Aug. 22, 1944.  R. E. GRAHAM  2,356,514
ELECTRICAL SWITCHING
Filed Oct. 9, 1942  5 Sheets-Sheet 1

INVENTOR
R. E. GRAHAM
BY
M. R. McKenney
ATTORNEY

Aug. 22, 1944.   R. E. GRAHAM   2,356,514
ELECTRICAL SWITCHING
Filed Oct. 9, 1942   5 Sheets-Sheet 3

INVENTOR
R. E. GRAHAM
BY
ATTORNEY

Aug. 22, 1944.   R. E. GRAHAM   2,356,514
ELECTRICAL SWITCHING
Filed Oct. 9, 1942   5 Sheets-Sheet 4

INVENTOR
R. E. GRAHAM
BY
ATTORNEY

Aug. 22, 1944.  R. E. GRAHAM  2,356,514
ELECTRICAL SWITCHING
Filed Oct. 9, 1942  5 Sheets-Sheet 5

| FIG. 1 | FIG. 2 |
| --- | --- |
| FIG. 3 | FIG. 4 |

INVENTOR
R. E. GRAHAM
BY
ATTORNEY

Patented Aug. 22, 1944

2,356,514

UNITED STATES PATENT OFFICE 2,356,514

ELECTRICAL SWITCHING

Robert E. Graham, New York, N. Y., assignor to Bell Telephone Laboratories, Incorporated, New York, N. Y., a corporation of New York Application October 9, 1942, Serial No. 461,433

9 Claims. (Cl. 179—18)

This invention relates to electrical switching and particularly to mechanisms for use in communication switching systems.

The objects of the invention are to simplify the devices used to perform the switching of communication lines and other electrical circuits; to eliminate to a large extent the moving mechanisms heretofore used for this purpose; to increase the speed with which connections may be established, and in other respects to obtain improvements in switching systems.

Many varieties of automatic switching have been proposed in the past for interconnecting the lines of telephone, telegraph and other communication systems. In many cases these mechanisms have depended largely upon the use of electromechanical devices in which moving parts serve to perform the selective and connecting operations involved in the establishment of the desired connections. While some of these types have been developed to a high degree of reliability it is true, nevertheless, that the presence of moving mechanical elements imposes limitations on the speed of operation and also introduces other problems. Also there have been a number of suggestions heretofore for the use of electron beams for selecting telephone lines and other similar circuits. For example, systems have been proposed in which a group of lines is scanned repeatedly by an electron beam and in which means is effective each time the beam encounters one of a pair of lines in conversation to direct automatically a second beam into engagement with the other line of the pair, thus establishing momentary conversational connections between the lines. Such a system is disclosed and claimed in an application by F. A. Hubbard, Serial No. 461,428, filed October 9, 1942.

According to the present invention improvements are obtained over these prior systems, and particularly the one disclosed in the Hubbard application, by means of a system in which the connection establishing beam travels over its successive positions in a fixed path of movement, such as a circular path, and in which the movement of the beam to select any one of its positions is controlled by two variable voltage components derived from a single selection control beam. More specifically, the pairs of lines of a group are interconnected for conversation by a link having a finder or primary beam switch and a connector or secondary beam switch, each of the switches having a rotary beam of electrons which sweep over the electrodes representing the individual lines. The finder beam scans the lines repeatedly, and the connector beam is directed automatically to one line of a pair each time the finder beam encounters the other line of the pair in conversation. The circular movement of the connector beam is controlled by a magnetic field comprising two components, both of which are variable, to cause the beam to move to any one of its positions around the circular path. These two magnetic components are produced by a selection control tube having a single beam which is movable to different positions in accordance with the registered designations of the calling and called lines of a pair. The beam of the selection control tube impinges upon a pair of collector electrodes which supply the voltages for controlling the variable magnetic components of the connector switch. A pair of masks are interposed in the path of the selection control beam, and these masks are so shaped that they permit variable amounts of energy to reach the collector electrodes depending upon the position taken by the beam, which in turn is determined by the designation of the line. Since the movement of the connector beam is in the path of a circle, the different selective positions of the beam are obtained by subjecting it to magnetic components which vary respectively with the sine and the cosine of the beam angle. Hence these variable magnetic values are obtained by shaping the masks in the selection control tube in the form of sine and cosine curves respectively.

Another feature of the invention is a system in which a designation scanning beam is caused to scan repeatedly the registers of the calling and called lines to determine the designations of each pair of lines involved in a conversation and in which the voltage representing the designation of each line of a pair is applied to the selection control tube to control the position of the beam so that the energy passing to the collector electrodes produces magnetic components of the proper values to direct the beam of the connector switch to the other line of the pair engaged in conversation.

These and other features of the invention will be discussed more fully in the following specification and will also be set forth in the appended claims.

In the drawings accompanying the specification:

Figs. 1 to 4, when arranged in the order illustrated in Fig. 6, disclose a telephone system incorporating the features of this invention;

Figure 1:
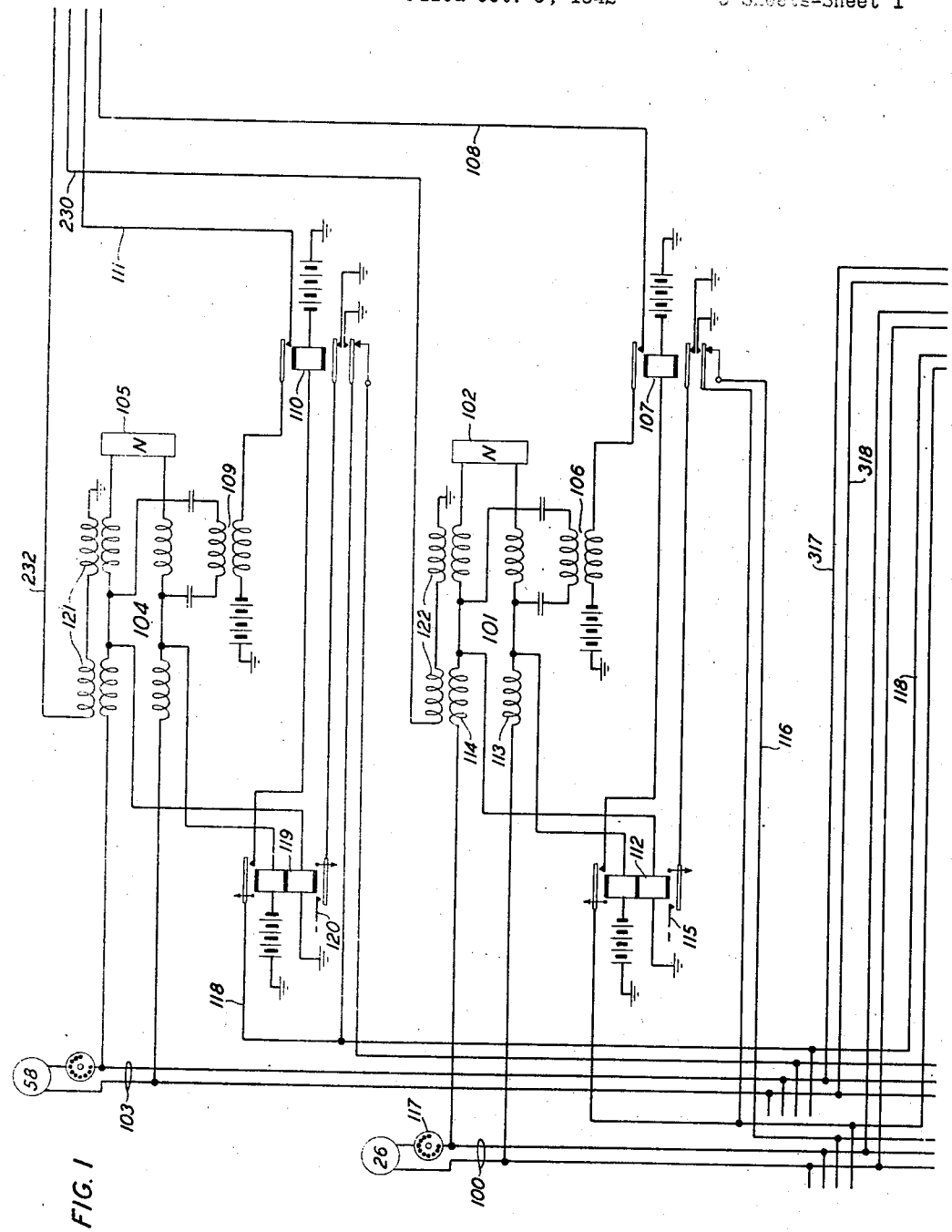
Fig. 1 shows two of the subscribers' lines together with the line circuits and associated equipment.
Figure 2:
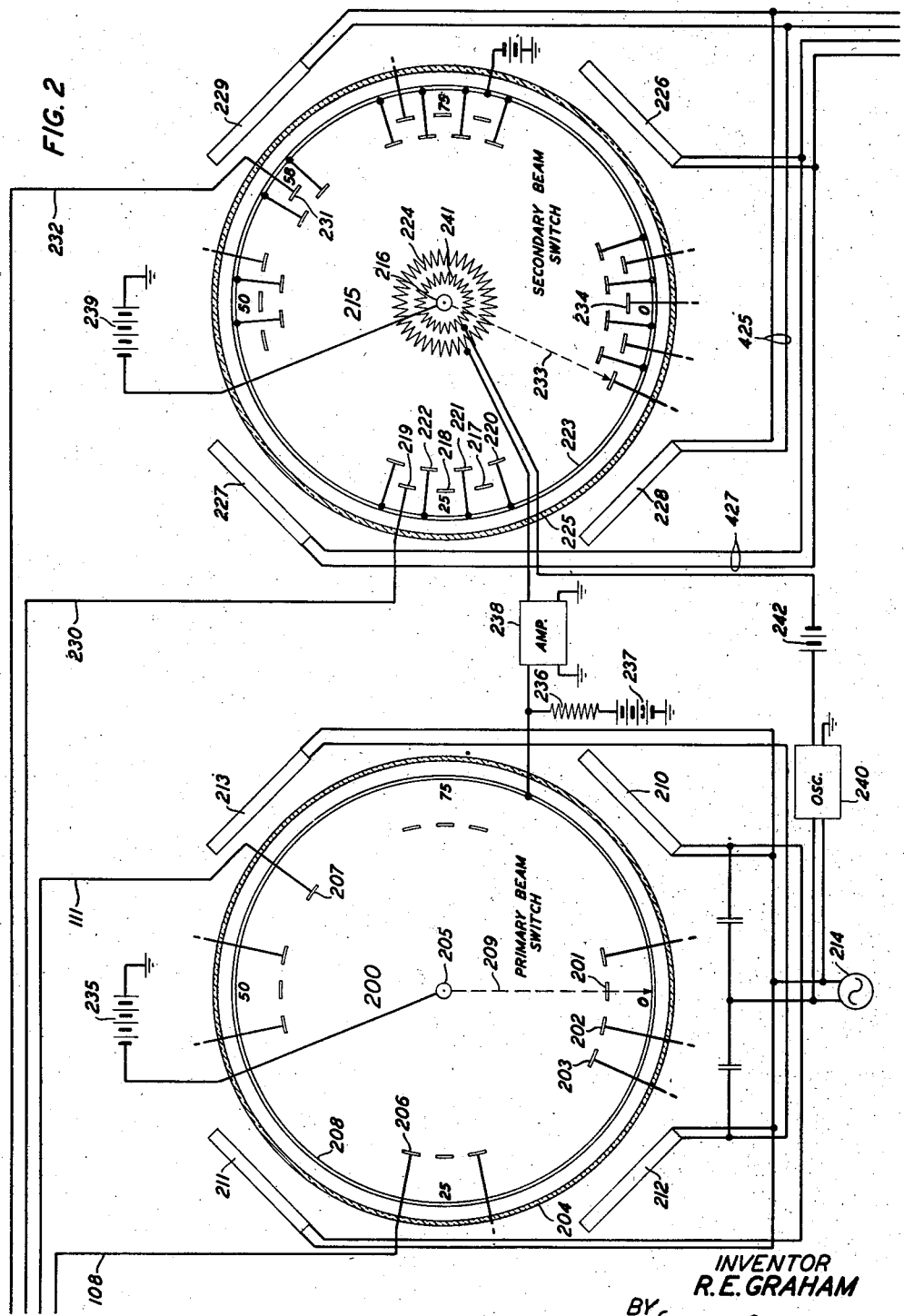
Fig. 2 shows primary and secondary beam switches in which all of the lines appear, the primary switch serving to transmit voice signals originating in all lines engaged in conversation and the secondary switch serving to transmit the voice signals to all lines engaged in conversation.
Figure 3:
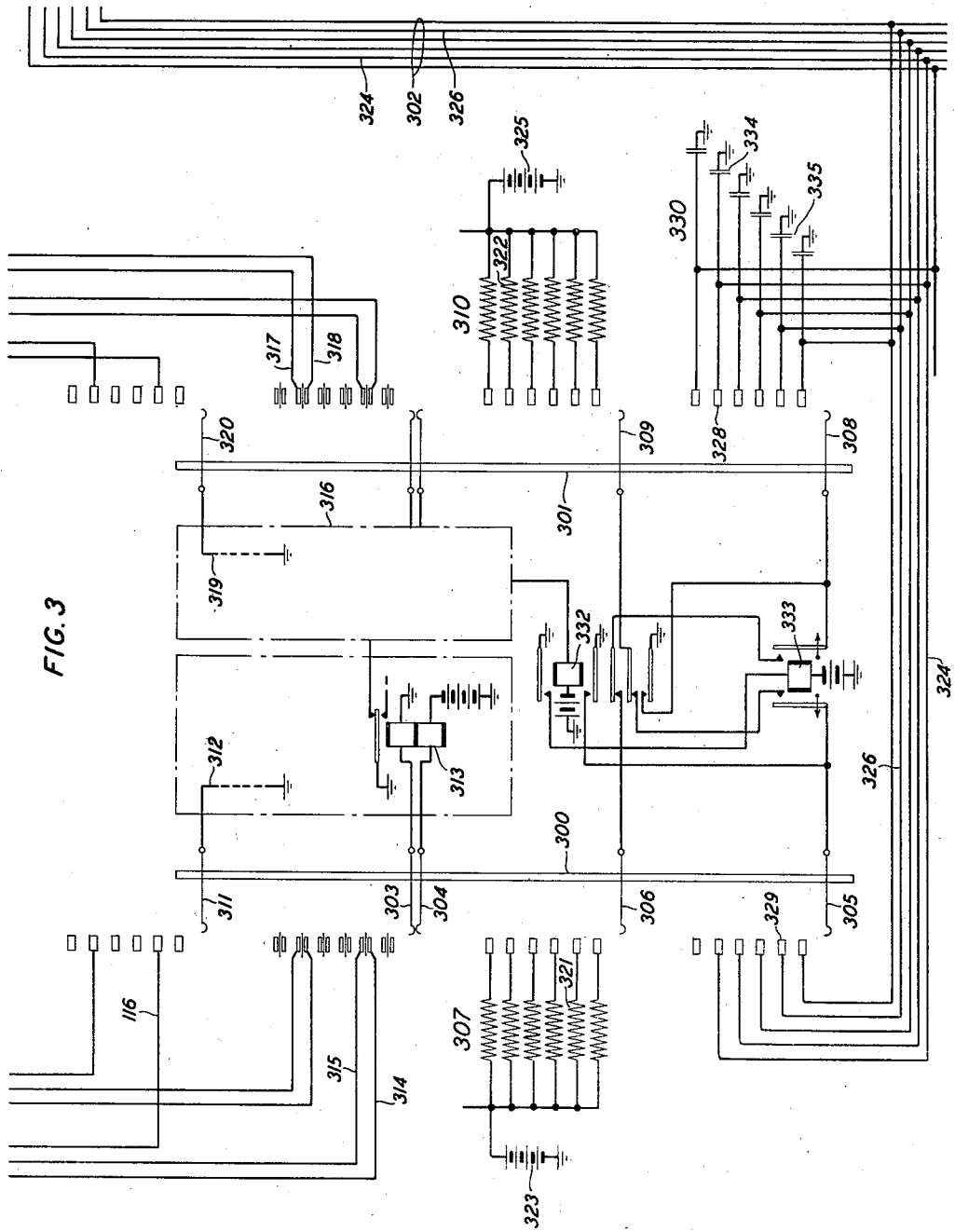
Figure 4:
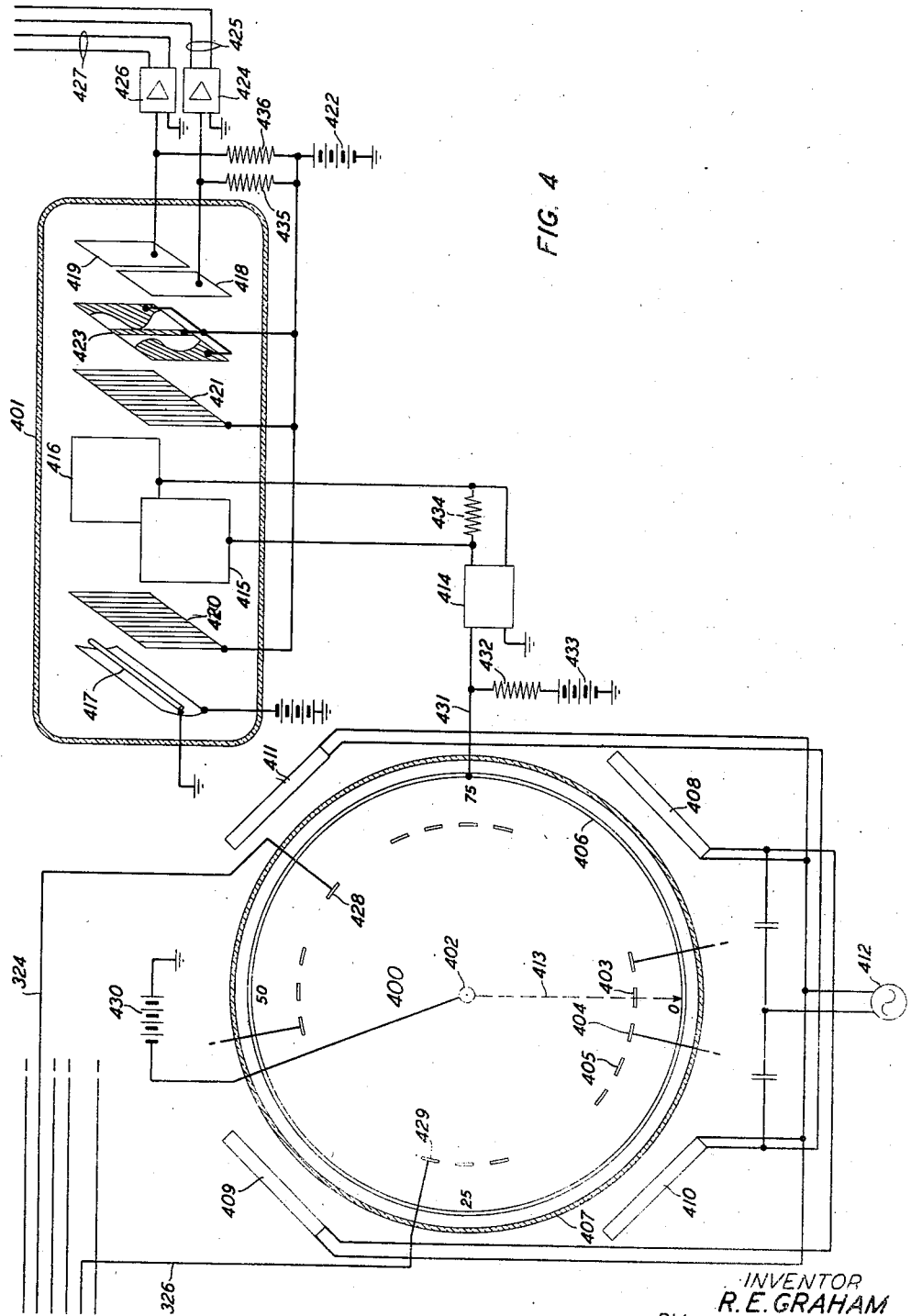
Figures 5, 6:
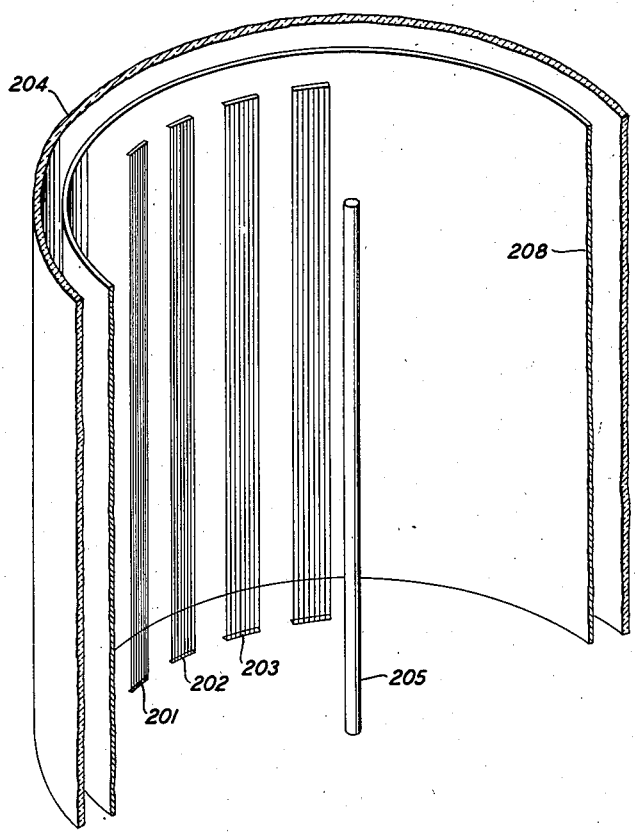

Fig. 3 discloses a pair of registers for registering the designations for the calling and called lines;

Fig. 4 discloses a designation scanning switch for scanning the designations set up on the registers of Fig. 3 and also a selection control tube for controlling the deflection of the beam of the secondary switch; and Fig. 5 is a fragmentary view illustrating the structure of the beam switches shown in Figs. 2 and 4.

The invention in its broader aspects contemplates a multiplex system in which a plurality of communication channels are established concurrently for voice communication, telegraph signaling, or transmission of any other desired kind. In the present disclosure, however, a telephone system has been chosen for the purpose of illustrating the invention. It is also assumed that there are one hundred lines in this system, all of which may be subscribers' lines, if desired, or a part of which may be trunks, such as those interconnecting one telephone office with another. In any event it will be obvious that the invention is not limited to any particular capacity nor to any particular division or disposition of the circuits comprising this system.

Referring to the drawings, it will be noted that each of the subscribers' lines in the system appears at the central office in a transmission transformer of the hybrid type whereby voice currents outgoing from the line and incoming thereto may be transmitted and received without mutual interference. For example, subscriber's line 100 appears in the hybrid transformer 101 and balancing network 102 and the line 103 appears in the hybrid transformer 104 and balancing network 105, and the same is true of each of the remaining lines in the system.

Each of the one hundred lines in the system also has an individual appearance in the primary beam switch 200. To this end the switch 200 comprises a ring of one hundred modulating electrodes 201, 202, 203, disposed within a suitable glass envelope 204 and concentrically arranged with respect to a central electron-emitting cathode 205. These modulating electrodes are numbered sequentially and are connected respectively to the subscribers' lines bearing the corresponding designation numbers. For example, line 100, which may be assumed to have the designation "26," is connected by way of transformer 106, contacts of the cut-off relay 107 and conductor 108 to the No. 26 modulating electrode 206 in the beam switch 200; the line 103, having the designation "58," is connected by way of transformer 109 and the cut-off relay 110 and conductor 111 to the No. 58 modulating electrode 207.

As above mentioned, the primary beam switch 200 has an electron-emitting cathode 205, and this cathode is preferably in the form of a filament having substantial length. The anode, shown more clearly in Fig. 5, comprises a cylinder 208, concentrically arranged within the cylindrical envelope 204 and also with respect to the central cathode 205. The modulating electrodes 201, 202, 203, are also arranged in a cylindrical row in proximity to the anode 208 and concentric with the central cathode 205. Each of these modulating electrodes comprises a screen, formed of parallel conductors or in any other suitable manner, through which the sheet or beam of electrons 209 emitted by the cathode 205 passes on its way to the anode 208. The switch 200 is also provided with four electromagnetic coils 210, 211, 212 and 213 arranged in quadrature around the exterior of the housing tube 204 serving when energized by a source of alternating current 214 to set up a magnetic field which rotates around the cathode 205 at a speed corresponding to the frequency of the source 214. The effect of this rotating magnetic field is to concentrate the electrons emitted from the cathode 205 in a well-defined sheet which sweeps around the cathode as an axis in synchronism with the rotating field. For a better understanding of the structure and operation of rotating beam tubes of this type, reference is made to the patent to Skellett 2,217,774 of October 15, 1940. For the purposes of the present system, it is desirable that half of the electron sheet or beam be suppressed so that it encounters one line at a time, and the manner in which this suppression may be accomplished is also disclosed in said Skellett patent. Thus, as the electron beam 209 sweeps over the ring of modulating electrodes individual to the respective subscribers' lines it is varied in accordance with the potentials existing on these electrodes and in turn causes corresponding potential variations on the collector anode of the switch. As will be explained hereinafter, these potential variations of the anode of the primary switch 200 cause corresponding variations in the electron beam emitted by the secondary beam switch 215.

The secondary beam switch 215 is similar in its structure and principle of operation to the switch 200. It comprises a central electron-emitting cathode 216, a ring of one hundred separate anodes 217, 218, 219, individual respectively to the subscribers' lines and spatially arranged in the same numerical order as the modulating electrodes of the primary switch 200. Also the secondary switch 215 comprises a concentric row of grids 220, 221, 222, etc., all of which are electrically connected in common by the multiple ring 223 and are held at a potential which is slightly lower than the direct potential of the individual anodes. The switch 215 also has a control grid 224 surrounding the cathode 216 and located in proximity therewith, and all of the foregoing elements are contained within the cylindrical housing tube 225. Like the switch 200, the beam switch 215 is provided with two sets of quadrature driving coils 226, 227 and 228, 229. As mentioned above, each of the one hundred subscribers' lines appears in the corresponding one of the anodes 217, 218, 219, etc. For example, line 100 appears in the No. 26 anode 219 by way of conductor 230 and the coils of the hybrid transformer 101; and line 103 appears in the No. 58 anode 231 by way of conductor 232 and the coils of hybrid transformer 104.

Since the designations of the calling and called lines of any conversational pair are utilized to determine the relationship between the beams of the primary and secondary connecting switches 200 and 215, a number of sets of registers are provided in the central office for registering the designations of the subscribers' lines. Each set of registers, such as the one shown in Fig. 3, comprises a pair of two-motion step-by-step switches 300 and 301 which may be of any well-known type commonly used as line finders and connectors in automatic telephone systems. The subscribers' lines appear according to their numerical designations in the terminal banks of the register switch 300, which operates automatically like a line finder to find the terminals of any line on which a calling condition is present. Having found the calling line, the vertical and rotary movements performed by the switch 300 are a measure or a registration of the tens and units digits of the line. The other step-by-step register switch 301 corresponds to the well-known connector switch and responds to the impulses transmitted by the calling subscriber to perform vertical and rotary movements representing the tens and units digits of the called line or circuit and in so doing establishes a registration of the called designation. The subscribers' lines appear in accordance with their designations in the terminal bank of the register switch 301 for signaling and controlling purposes. As many of these sets of calling and called line register switches 300, 301 will be provided in the office as are necessary.

In order that the register switches 300 and 301 may be restored to common use as soon as they have registered the numbers of one pair of lines, these number registrations are transferred to the condenser register 330 following the completion of dialing, and the switches are automatically released. This is accomplished by operating relays 332 and 333 for an interval after the switches are set to close a charging circuit for one of the condensers 330 in series with the selected resistor 307 and to close a charging circuit for a second one of the condensers in series with the selected resistor 310. The condensers are of sufficient capacity to hold their charges during the conversational period. More specifically, relay 332 operates for an interval and then releases. While operated, it closes a circuit for slow-release relay 333 and also obvious circuits for draining the condensers of any charges they may have previously acquired. When relay 332 releases, and while relay 333 still holds, the charging circuits above-mentioned are closed for the register condensers selected by the positioned switches 300 and 301. Thereupon relay 333 releases and switches 300 and 301 are restored in any well-known manner.

In order that the beams of the connecting switches 200 and 215 may be caused to impinge, during each scanning cycle, simultaneously upon the electrodes representing the calling and called lines of all pairs engaged in conversation concurrently it is necessary to examine repeatedly the registrations set up on the sets of register switches. This repeated examination is performed by the designation scanning switch 400 which imparts the information it derives from the registers to a selection control tube 401 which in turn controls the instantaneous positions assumed by the beam 233 of the switch 215. The scanning switch 400, which is common to all of the register switch sets 300 and 301, is preferably a rotary beam device similar to the switches 200 and 215. It has a central electron-emitting cathode 402, an annular row of one hundred modulating electrodes 403, 404, 405, etc., spatially arranged and numbered the same as the modulating electrodes 201, 202, 203 of the primary switch 200, and the same as the anodes 217, 218, 219 of the secondary switch 215. The scanning switch 400 is also provided with a cylindrical anode 406, concentrically arranged within the envelope 407 and quadrature coils 408, 409, 410 and 411 energized from a source 412 to produce a rotating magnetic field for rotating the beam 413. The sources 214 and 412 are of the same frequency and are maintained in phase whereby the beams 209 and 413 are driven at the same speed and in the same phase over their electrodes. Or if desirable the beams of switches 200 and 400 may be driven from a single source.

The series of one hundred modulating electrodes 403, 404, 405, of the scanning switch 400 are connected over the multiple conductors 302 to the register condenser 330. The connections between the series of one hundred electrodes in the switch 400 and the one hundred condensers in the register 330 correspond with the numerical appearance of the hundred subscribers' lines in the switches 300 and 301. That is to say, when the brushes 303 and 304 of the switch 300 are resting on the terminals of a subscriber's line of any given number, the brush 305 of said switch is also connected to the condenser 330 which in turn is connected to the modulating electrode of the same number in the scanning switch 400; and the same is true of the other register switch 301.

When the switch 300 is set in any one of its hundred positions to find a particular calling line, the brush 306 selects one of a group of one hundred graduated resistors 307, the value of the selected resistor characterizing the number of the calling line. Since the brush 306 is connected through the brush 308 of the switch 301 to the condenser 330 and to the modulating electrode in the switch 400 representing the called line, it follows that the condenser receives a charge in series with resistor 307 which is a representation of the designation of the calling line and that the condenser applies a corresponding potential to the modulating electrode. In like manner, the setting of the switch 301 on the called line causes the brush 309 to select the graduated resistor 310 representing the number of the called line, a corresponding charge is stored in a condenser 330 by way of brush 305 of switch 300, and a corresponding potential is applied to the modulating electrode of the calling line in the scanning switch 400. Therefore, as the beam 413 scans over the modulating electrodes, the potential produced on the common collecting anode 406 at the instant the beam is in the position representing any calling line is a measure of the number of the called line of the conversational pair; likewise, each time the beam occupies the position corresponding to any called line, it establishes a potential on the anode 406 which is a measure of the number of the calling line.

The instantaneous potentials thus produced on the anode 406 of the scanning switch, which represent the numbers of the calling and called lines of the various conversational pairs, are amplified by a suitable amplifier 414 and applied to the electrostatic deflection plates 415 and 416 of the selection control tube 401. The tube 401 comprises an electron-emitting cathode 417 designed to emit a sheet of electrons which, as will be explained presently, impinge in varying degrees of intensity upon the pair of anodes 418 and 419. An acceleration grid 420 and a screen grid 421 are provided, as illustrated, in the path of the electron sheet, and both of these grids are connected to the positive pole of battery 422. Also interposed in the path of the electron sheet is an anode mask 423 having contours corresponding to the sine and cosine trigonometric functions. The output potential to the anode 418 resulting from the impingement of the electron sheet thereon is amplified by a suitable amplifier 424, and the output voltage of the amplifier is applied over circuit 425 to the quadrature coils 228 and 229. Similarly the output from the other anode 419 is amplified by amplifier 426 and applied over circuit 427 to the quadrature coils 226 and 227. Normally, when the electrostatic deflection plates 415 and 416 are at zero potential, the electron sheet emitted by the cathode 417 is focussed and controlled by any suitable magnetic focussing means, well known in the art, such that the output voltage from the anodes 418 and 419 produce an energization of the coils 226, 227, 228, 229, such that the beam 233 of the switch 215 dwells on the No. 0 anode 234. However, when a voltage is applied to the plates 415 and 416 representing the number of a subscriber's line, the electron sheet is adjusted to a corresponding position along the contours of the mask 423, the anodes 418 and 419 are brought to potentials representing the sine and cosine functions of the angle of the beam 233, and the quadrature coils of the switch 215 are energized accordingly to move the beam 233 from the position it occupies to the anode position representing the number of the subscriber's line. And in like manner, as the scanning beam 413 rotates over its electrodes the electron sheet in the tube 401 is adjusted from position to position along the contours of the mask 423, the anodes 418 and 419 are energized correspondingly, and the beam 233 of the switch 215 is repeatedly shifted from whatever position it occupies to the new position representing the designation of the line that is being scanned by the tube 400.

A detailed description will now be given of the operation of the system. Assume for this purpose that the subscriber of line 100, having the designation "26," wishes to converse with the subscriber of line 103, having the designation "58." The initiation of the call by the calling subscriber results in the closure of a circuit from battery through the upper winding of line relay 112, transformer coil 113 thence over the loop of the line 100 and returning through transformer coil 114, lower winding of relay 112 to ground. Relay 112, which is slow to release in character, attracts its armatures and applies ground potential through the normal contact of cut-off relay 107, closed contact of relay 112 to the start conductor 115. The start condition on the conductor 115 serves in the well-known manner to cause an idle one of the switches 300 to operate automatically in its vertical and rotary movements to seize the calling line 100. Assuming that the switch 300 is the one that is taken for use to serve this particular call, it closes a circuit, upon reaching the calling line 100, from battery through the winding of cut-off relay 107, closed contacts of relay 112, normal contacts of relay 107, conductor 116, brush 311 of switch 300 to ground over the control conductor 312. The application of battery potential to the conductor 312 serves in the well-known manner to terminate the hunting movement of the switch, whereupon ground potential is applied over conductor 312 in the line finder to cause the operation of the cut-off relay 107. Before this operating circuit is opened, the cut-off relay 107 closes a locking circuit for itself traceable from battery through the winding of said relay, closed contacts of relay 112 to ground at the front contacts of relay 107. Relay 107 at its inner lower armature opens the start conductor 115 to prevent the starting of another finding switch and at its outer lower armature removes the hunting condition from conductor 116 extending to the other finding register switches.

The calling subscriber now proceeds to manipulate his dial 117 to transmit first the tens digit "5" and then the units digit "8" of the called line 103. The impulse circuit for this purpose may be traced from battery through the bottom winding of impulse relay 313, brush 304, conductor 314, thence over the loop of subscriber's line 100 and returning over conductor 315, brush 303, upper winding of relay 313 to ground. The impulse relay 313 responds to these series of impulses to cause the operation of the register switch 301 in a vertical direction to the level of terminals representing the tens digit "5" and in a rotary direction to a set of terminals in the level representing the units digit "8." While these impulses are being transmitted by the calling subscriber, the line relay 112 being slow to release, retains its armatures in their attracted position to maintain the circuit relations above described. When the register switch 301 positions its brushes on the terminals of the called line 103, the ringing and control mechanism 316 associated with the switch 301 applies ringing current over conductors 317 and 318 to the called line 103. The response of the called subscriber causes the disconnection of ringing current and the closure of a circuit from ground over conductor 319, brush 320, conductor 118, closed contact of relay 119, which is operated when the called party answers, winding of cut-off relay 110 to battery. Relay 110 operates and locks in a circuit traceable from battery through its winding, closed contacts of relay 119 to ground at the front contact of relay 110. Relay 110 opens the start conductor 120 and applies ground potential to the conductor 118 to render the line 103 busy in the banks of the connector register switches.

The register switch 300 is now in the particular one of its hundred selective positions corresponding to the number of the calling line 100 and has therefore selected the graduated resistor 321 which represents the calling line designation "26"; and the register 301 is in the particular one of its hundred positions corresponding to the called subscriber's line 103 and has selected the graduated resistor 322 which represents the called line number "58." The resistor 321 determines the charge to be applied to condenser 334, which in turn determines the potential to be applied to the control electrode in the common scanning switch 400 which represents the called subscriber's line. The circuit for producing this charge may be traced from the positive pole of battery 323, resistor 321, brush 306, contacts of relays 332 and 333, the first of which is released at this time and the second operated as hereinbefore explained, brush 308, terminal 328, condenser 334 to ground, the condenser also being connected over conductor 324 to the No. 58 control electrode 428 which is individual to the called line 103. Similarly, the resistor 322 determines the charge applied to condenser 335, which in turn is connected to the calling line electrode 429 in the switch 400. The charging circuit may be traced from the positive pole of battery 325, resistor 322, brush 309, contacts of relays 332 and 333, brush 305, terminal 329, and condenser 335.

As the cathode beam 413 sweeps around its axis at synchronous speed, it encounters the control electrode 429 and comes under the influence thereof for a brief space of time in each successive cycle. The effect of the electrode 429 is to adjust the flow of current in the anode circuit to a value which represents exactly the called line designation "58." This anode circuit may be traced from the negative pole of battery 430, cathode 402, beam 413, which is now passing through the control electrode 429, anode 406, conductor 431, resistor 432 to the positive pole of battery 433. The drop across the resistor 432 is amplified by the amplifier 414 and is applied across the resistor 434 and the electrostatic deflector plates 415 and 416. The electrostatic field set up by the plates 415 and 416 of the tube 401 causes the electron sheet emitted from the cathode 417 to assume a vertical position along the mask 423 which represents the value "58." The mask 423, which is connected to the positive pole of the battery 422, intercepts a portion of the electron sheet, allowing the remainder thereof to impinge upon the anodes 418 and 419. The circuit path for the flow of current resulting from the potential produced on the anode 418 may be traced from ground, cathode 417, thence over the electron path, anode 418, resistor 435 to the positive pole of battery 422. Likewise, the circuit for the other anode 419 includes the electron path and the resistor 436. The voltages generated across the resistors 435 and 436, which are a measure of the components of the electromagnetic field necessary to shift the beam 233 of the switch 215 to position 58, are amplified by the amplifiers 424 and 426 and are then applied over circuits 425 and 427 to the quadrature coils of the switch 215. These coils set up a magnetic field which is necessary to shift the beam 233 from whatever position it may occupy at the time to the No. 58 electrode 231 which is individual to the called line 103.

Thus at the instant the beam 413 in the scanning switch reaches the position of the calling line, at which instant the beam 209 of the primary switch 200 is also impinging on the electrode of the calling line, the beam 233 of the secondary switch 215 is directed automatically under the control of the tube 401 to the position representing the called line 103. If at this instant the calling subscriber is speaking the telephone currents flowing in his line are induced through the transformer 106 and are impressed by way of conductor 108 upon the control electrode 206. The potential variations of electrode 206 react upon the beam 209 and cause corresponding variations in the anode circuit of the switch 200 which may be traced from the negative pole of battery 235, cathode 205, beam 209, anode 208, resistor 236 to the positive pole of battery 237. These voltage variations in the resistor 236 are amplified by the amplifier 238 and are impressed upon the control grid 224. The varying potential on the grid 224 causes the intensity of the beam 233 to vary accordingly with the result that these variations are impressed upon the individual anode 231. The anode circuit for the secondary switch 215 may be traced from the negative pole of battery 239, cathode 216, beam 233, anode 231, conductor 232 through the coils 121 to ground. The varying potentials applied to the coils 121 are induced in the called subscriber's line, causing telephone currents to flow therein representing the calling subscriber's speech.

Also the beam 413 of the scanning switch 400 encounters once per cycle the electrode 428 representing the called subscriber's line 103. Since the potential on the electrode 428 is a measure of the calling line designation "26," the voltage thus produced in conductor 431, amplified by the amplifier 414, and applied to the plates 415 and 416 is a measure of the calling line designation. Therefore, the position of the electron sheet in the tube 401 represents the calling line number, and the output energy from the anodes 418 and 419 appearing in the circuits 425 and 427 causes the electromagnetic field around the secondary switching tube 215 to shift the beam 233 into engagement with the No. 26 electrode 219. At this same instant the beam 209, being in synchronism with the beam 41, engages the called line electrode 207. If, therefore, the called subscriber is speaking at the time, a varying voltage is induced through the transformer 109 and applied over conductor 111 to the electrode 207. The varying potential on the electrode 207 is reflected in the anode circuit of the switch 200 and in turn through the amplifier 238 in the potential applied to the control grid 224 of the switch 215. The control grid 224 causes the beam 233 to vary in intensity, and the resulting variation of the beam on the electrode 229 is impressed over conductor 230 and transformer coils 122 upon the calling subscriber's line 100 causing currents to flow therein representing the called subscriber's speech.

Thus a two-way conversational connection is established between the calling and called lines once for each cycle of the switches 200 and 400; and the same is true for each pair of subscribers' lines that may be engaged concurrently in conversation. Although each individual conversational connection over the electron beams is very brief in duration, the repetition is accomplished at such a high rate of speed that the effect is the same as though the lines were permanently connected together.

Since a plurality of pairs of lines may be engaged simultaneously in separate conversations and since the beam of the switch 215 plays over the field of electrodes in an intricate pattern, varying from time to time as the combination of lines in conversation changes, it may be desirable to suppress the beam while it is moving from one electrode to another and to render the beam effective only while it is dwelling on an electrode to which it has been directed by the controlling tube 401. To this end, an oscillator 240 is provided for controlling the suppressing grid 241, and a source of negative potential 242 is included in circuit with the grid. The negative potential of the source 242 when unaffected by the oscillator 240 maintains the grid 241 at a potential sufficient to suppress the flow of electrons from the cathode 216. The oscillator 240, however, which is maintained in a definite phase relation with the source 214, produces a voltage wave having a frequency which exceeds the frequency of source 214 by a ratio equal to the number of electrodes in the tube 200 over which the beam is driven in a cycle of the source 214. More specifically, the oscillator 240 produces a positive impulse in its output circuit for each electrode position over which the beam 209 sweeps. And the phase relation between the oscillator 240 and the driving source of the beam 209 is such that the positive impulses produced by the oscillator 240 and applied to the grid 241 do not reach an amplitude sufficient to overcome the negative battery 242 until the beam 209 of switch 200 has reached the next electrode and until the control tube 401 has applied its output voltages to the field coils of the tube 215. In other words, the virtual beam of the switch 215 is driven over the circular row of anodes and comes to rest on the desired anode before the operating pulse is applied by the oscillator 240 to the grid 241. When the impulse is thus applied, it overcomes the negative battery 242, the positioned virtual beam 233 resumes its real character, and electrons flow from the cathode 216 to the selected anode under the control of the grid 224 as above explained. The real beam of switch 215 continues to impinge on the selected anode and to transmit the signals to the corresponding line until the beam of switch 200 is about to move away from the electrode on which it is impinging and toward the next electrode. Thereupon the positive impulse from the oscillator 240 ceases, and the beam of switch 215 is suppressed and resumes its virtual character. As soon thereafter as the beam of switch 200 reaches the next electrode representing a line in conversation, the virtual beam of switch 215 is driven from whatever position it occupies at the time to the anode corresponding to the other line involved in the conversation, the positive impulse is then applied by the oscillator 240, and the beam 233 becomes real and transmits the conversational signals to said other line. Thus the beam of switch 215 assumes a virtual state, during the brief intervals in which it is being driven by the controlling tube 401 over the cylindrical row of anodes, to prevent interference with other lines that may be involved in conversation and have their anodes in the path of the moving beam, and assumes a real state only after it has been fully positioned on the anode of the desired line.

When the subscribers of lines 100 and 103 have finished their conversation, they replace their receivers, causing line relays 112 and 119 to release. These relays in turn cause the release of the cut-off relays 107 and 110.

It will be understood that the invention is not limited to any particular form of the beam devices chosen for illustration herein; any other suitable type may be used if desired, including those in which the beam has a rectangular pattern. Moreover, the invention is not limited to the use of switching devices having electron beams but also contemplates the use of other forms of energy beams. Furthermore, it will be understood that the electron emission in the tube 401, while illustrated as having the form of a sheet of substantial width, may be cylindrical in shape or may have any other desired shape, the essential feature being that the interposed masks shall intercept portions of the emission or beam and shall allow the remaining portions to pass to the anodes in such a way that the anode excitation is a measure of the line designation. And it will be understood that wherever, throughout the specification and claims, the electron emission is spoken of as a beam that this term includes the sheet forms illustrated in the drawings as well as all other forms or shapes and also includes beams in their real and virtual states.

What is claimed is:

1. The combination with a group of lines of a device for producing a connecting beam of energy, means including said device for establishing communicative connection between any pair of lines of said group, means for producing a controlling beam of energy, means for deriving a plurality of voltages from said controlling beam, means for varying the magnitudes of said derived voltages, and means for utilizing said voltages to control the position of said connecting beam to select a desired line.

2. The combination with a group of lines of a device for producing a connecting beam of energy, means including said device for establishing communicative connection between any pair of lines of said group, means for producing a controlling beam of energy, means for deriving a plurality of voltages from said controlling beam, means for moving said controlling beam to vary the magnitudes of said voltages, and means for utilizing said voltages to control the position of said connecting beam to select and establish communicative connection with a desired line.

3. The combination with a group of lines of a device for producing a connecting beam of energy, means including said device for establishing communicative connection between any pair of said lines, means for producing a controlling beam of energy, means for deriving a plurality of voltages from said controlling beam, means controlled in accordance with the designation of a desired line for moving said controlling beam to vary the values of said voltages, and means for utilizing said voltages to control the position of said connecting beam to select the desired line.

4. The combination with a group of lines of a device for producing a connecting beam of electrons, means for utilizing said beam for establishing communicative connection between any pair of said lines, means for registering the designation of a desired line, means for producing a controlling beam of electrons, means for deriving a plurality of energy components from said controlling beam, means controlled in accordance with said registered designation for determining the values of said energy components, and means for utilizing said energy components to control the position of said connecting beam to select the desired line.

5. The combination with a group of lines of a device for producing a connecting beam of energy, said device having electrodes in which said lines appear individually, means for establishing an electrical connection from one line to another over said beam, a controlling device including a pair of electrodes, means for causing a control beam of energy to impinge on said pair of electrodes to produce voltage components, a mask in the path of said control beam for varying the values of said voltage components, and means controlled by said voltage components for directing said connecting beam into engagement with the electrode of any desired line to establish connection with said line.

6. The combination with a group of lines of a device for producing a connecting beam of energy, said device having electrodes in which said lines appear individually, means for establishing an electrical connection from one line to another over said beam, a controlling device including a pair of electrodes, means for causing a control beam of energy to impinge on said pair of electrodes to produce voltage components, a mask in the path of said controlling beam having a contour shaped to vary said voltage components by varying the amount of beam energy impinging on said pair of electrodes, and means controlled by said voltage components for selectively moving said connecting beam into engagement with the electrode of any desired line to establish connection therewith.

7. The combination with a group of lines of a device for producing a connecting beam of energy, said device having a series of electrodes in which said lines appear individually, means for establishing a communicative connection from one line to another over said beam, a controlling device including a pair of anodes and means for producing a control beam of energy, means for moving said control beam into engagement with said anodes simultaneously, the impingement of said control beam on said anodes serving to produce energy components, masks in the path of said control beam for varying the amount of beam energy impinging on said anodes to vary in turn the values of said energy components, and means energized by said energy components to produce a magnetic field for selectively positioning said connecting beam in engagement with the electrode of any desired line to establish connection therewith.

8. In combination, a plurality of lines, an electron beam tube having a circular row of electrodes, said lines appearing individually in said electrodes, means for producing a connecting beam of energy for rotation over said circular row of electrodes to establish connection with said lines, a controlling device including a pair of anodes, means for causing a control beam of energy to impinge simultaneously on said anodes to produce voltage components, means for varying the values of said voltage components in accordance with the functional values of the angle of said connecting beam, and means controlled by said voltage components for directing said connecting beam into engagement with the electrode in said circular row corresponding to the angle represented by the functional values of said voltage components.

9. In combination, a group of lines, an electron tube having a circular row of electrodes in which said lines appear individually, means for producing a primary beam of electrons and for causing said beam to rotate repeatedly over said electrodes, a second electron tube including a circular row of electrodes in which said lines appear individually, means for producing a secondary beam of electrons for rotary movement over the electrodes of said last-mentioned tube, a control tube including a pair of anodes, means for producing a control beam of electrons and for causing the same to impinge on said anodes to produce energy components, means effective each time the primary beam engages one line of a pair of lines in conversation for positioning said control beam to determine the values of said energy components in accordance with the designation of the other line of said pair, and means responsive to said energy components for causing said secondary beam to move into engagement with the other line of said pair to establish a communicative connection between said lines.

ROBERT E. GRAHAM.